(12) United States Patent
Greco et al.

(10) Patent No.: US 11,215,304 B2
(45) Date of Patent: *Jan. 4, 2022

(54) QUICK-CONNECT ADAPTER FOR REMOVABLY CONNECTING COMPONENTS IN A FLUID SYSTEM

(71) Applicant: Ginsey Industries, Inc., Swedesboro, NJ (US)

(72) Inventors: Christopher E. Greco, Sewell, NJ (US); Matthew J. Del Duke, Audubon, NJ (US)

(73) Assignee: GINSEY INDUSTRIES, INC.

( * ) Notice: Subject to any disclaimer, the term of this patent is extended or adjusted under 35 U.S.C. 154(b) by 0 days.

This patent is subject to a terminal disclaimer.

(21) Appl. No.: 16/813,322

(22) Filed: Mar. 9, 2020

(65) Prior Publication Data

US 2020/0208766 A1 Jul. 2, 2020

Related U.S. Application Data

(63) Continuation of application No. 16/146,804, filed on Sep. 28, 2018, now Pat. No. 10,584,819.

(60) Provisional application No. 62/684,453, filed on Jun. 13, 2018.

(51) Int. Cl.
   *F16L 37/084* (2006.01)
   *F16L 41/02* (2006.01)
   *F16L 29/02* (2006.01)
   *F16L 37/086* (2006.01)

(52) U.S. Cl.
   CPC ........... *F16L 37/0841* (2013.01); *F16L 29/02* (2013.01); *F16L 37/086* (2013.01); *F16L 41/021* (2013.01)

(58) Field of Classification Search
   CPC ....... F16L 37/0841; F16L 37/20; F16L 37/38; F16L 37/40
   USPC .......................... 285/317, 308, 309, 310, 319
   See application file for complete search history.

(56) References Cited

U.S. PATENT DOCUMENTS

| | | | | |
|---|---|---|---|---|
| 5,090,747 A | * | 2/1992 | Kotake | F16B 21/16 285/305 |
| 5,143,347 A | * | 9/1992 | Lee | F16L 37/0841 251/149.6 |
| 5,799,346 A | * | 9/1998 | Tiernan | E03C 1/06 211/105.6 |
| 5,904,376 A | * | 5/1999 | Yuen | F16L 33/223 285/148.19 |

(Continued)

*Primary Examiner* — Aaron M Dunwoody
(74) *Attorney, Agent, or Firm* — Troutman Pepper Hamilton Sanders LLP

(57) ABSTRACT

An adapter for connecting components in a fluid system has an adapter body defining a cylindrical space and lock buttons which are biased into a locked position to secure the adapter to another component. The adapter body has a circular collar defining an inlet into the cylindrical space, a channel defining an outlet out of the cylindrical space, a support wall and a support flange defining one or more cutouts in an outer cylindrical side wall of the adapter body, and a slot defined between the collar and the support wall connecting the one or more cutouts to the cylindrical space. The lock buttons have a contact element positioned in one of the cutouts and an arm projecting positioned in the slot. The arms are partially in the cylindrical space in the locked position and are movable into an unlocked position when the contact elements are moved toward each other.

15 Claims, 8 Drawing Sheets

(56) References Cited

U.S. PATENT DOCUMENTS

| | | | | |
|---|---|---|---|---|
| 6,024,124 A * | 2/2000 | Braun | F16L 37/0841 | 137/614.03 |
| 6,142,537 A * | 11/2000 | Shimada | F16L 37/142 | 285/308 |
| 6,783,364 B1 * | 8/2004 | Juan | F16L 37/48 | 433/80 |
| 7,159,797 B1 * | 1/2007 | Lammers | B05B 15/65 | 239/394 |
| 8,500,173 B2 * | 8/2013 | Zahler | A61B 1/00105 | 285/317 |
| 2002/0000720 A1 * | 1/2002 | Knowles | F16L 35/005 | 285/308 |
| 2004/0217196 A1 * | 11/2004 | Yurek, Jr. | E03C 1/0408 | 239/289 |
| 2006/0165479 A1 * | 7/2006 | Lorenz | F16L 37/0841 | 403/223 |
| 2011/0210541 A1 * | 9/2011 | Lewis | F16L 37/56 | 285/317 |
| 2014/0353961 A1 * | 12/2014 | Milhas | F16L 37/0841 | 285/82 |
| 2015/0076815 A1 * | 3/2015 | Lombardi, III | A61M 39/10 | 285/317 |
| 2015/0137516 A1 * | 5/2015 | Pangburn | F04B 53/16 | 285/347 |
| 2015/0176741 A1 * | 6/2015 | Juan | F16L 37/0841 | 285/8 |
| 2016/0201835 A1 * | 7/2016 | Jones | F16L 37/0841 | 285/305 |
| 2016/0252201 A1 * | 9/2016 | Chintalapati | F16L 37/0841 | 285/305 |
| 2016/0305589 A1 * | 10/2016 | Wildfang | E03C 1/025 | |
| 2017/0045170 A1 * | 2/2017 | Lewis | A61M 39/10 | |
| 2017/0211738 A1 * | 7/2017 | Tiberghien | F16L 37/144 | |
| 2018/0023741 A1 * | 1/2018 | Lu | F16L 37/0841 | 285/305 |

* cited by examiner

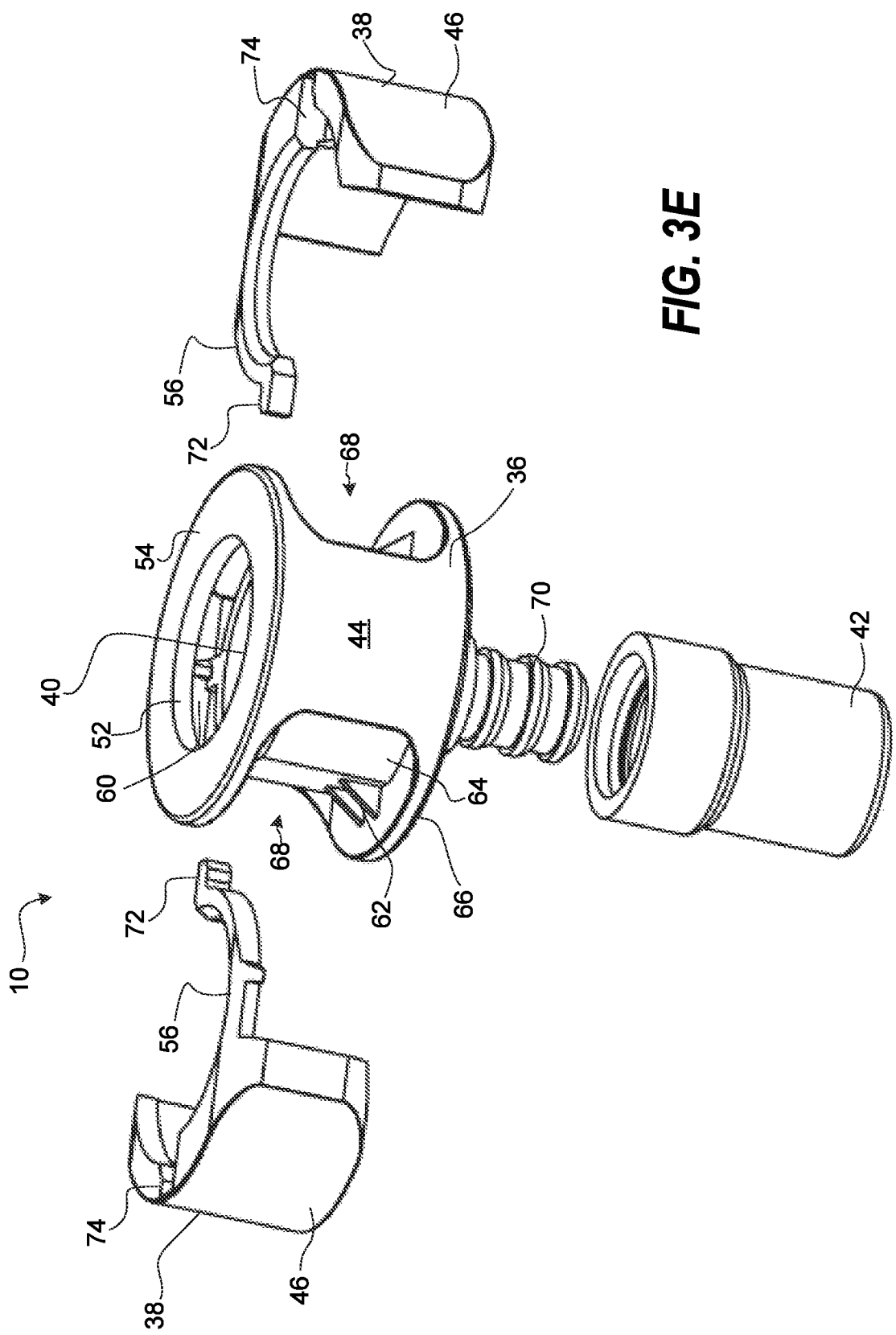

QUICK-CONNECT ADAPTER FOR REMOVABLY CONNECTING COMPONENTS IN A FLUID SYSTEM

CROSS-REFERENCE TO RELATED APPLICATIONS

This application is a continuation of U.S. patent application Ser. No. 16/146,804 filed Sep. 28, 2018 which claims the benefit of U.S. Provisional Application Ser. No. 62/684,453 filed Jun. 13, 2018, the entire contents of each of which are incorporated herein by reference in their entirety.

TECHNICAL FIELD

The present disclosure relates generally to a quick-connect adapter, and, more particularly, to a quick-connect adapter for removably connecting components in a fluid system.

BACKGROUND

Connectors in fluid systems include joints and valves that create a fluid connection between fluid conduits such as pipes, and hoses, and dispensing devices such as faucets and sprayers, and containers to allow a fluid to flow into and out of components joined by the connector. Removable connectors form joints which can be readily attached and detached without the need for specialized tools. These connectors need to be able to create a strong connection between components able to withstand the associated fluid pressure without leaking or becoming detached. Moreover, it should be easy to attach and detach a connector while maintaining the strong bond. Conventional removable connectors in a fluid system include threaded connectors, such as those typically found at the end of a household faucet or hose. However, these and other conventional connectors are often difficult to attach, are easily damaged or oxidized, and are prone to leaks. Some fluid systems are fitted with quick-connect adapters utilize a ball lock, pin lock, or twist lock as a connection mechanism to enable quicker and easier connection. While these options are useful, they are not always cost effective and may not be suitable in some situations.

The present disclosure is directed to overcoming these and other problems of the prior art.

SUMMARY

In some embodiments, an adapter for connecting components in a fluid system includes an adapter body defining a cylindrical space and one or more lock buttons. The adapter body includes a circular collar defining an inlet into the cylindrical space, a channel defining an outlet out of the cylindrical space, a support wall and a support flange defining one or more cutouts in an outer cylindrical side wall of the adapter body, and a slot defined between the collar and the support wall connecting the one or more cutouts to the cylindrical space. The one or more lock buttons include a contact element positioned in a corresponding cutout of the one or more cutouts, and an arm projecting away from the contact element and positioned in the slot. The one or more lock buttons are biased into a locked position in which a portion of the arms of the one or more lock buttons are partially in the cylindrical space and are movable into an unlocked position in which the arms of the one or more lock buttons are covered by the collar such that the arms are not in the cylindrical space.

In another embodiment, a connection system for fluidly connecting components includes a first component and a second component. The first component includes a cylindrical body defining a channel and a circumferential groove formed in an outer surface of the cylindrical body. The second component includes a body and a pair of lock buttons. The body defines a cylindrical space configured to receive the cylindrical body of the first component, a pair of cutouts formed in an outer side wall of the body, and a slot connecting the pair of cutouts to the cylindrical space. The pair of lock buttons each comprise a contact element positioned in a corresponding cutout of the one or more cutouts, and an semi-circular arm projecting away from the contact element and positioned in the slot. The lock buttons are biased into a locked position in which distal ends of the arms engage the body of the first component in the circumferential groove and are movable into an unlocked position in which the distal ends of the arms are moved out of the circumferential groove through the contact elements being moved toward each other.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there are shown in the drawings embodiments that are presently preferred, it being understood, however, that the invention is not limited to the specific instrumentalities disclosed. Included in the drawings are the following Figures:

FIG. 3E is an exploded view of the adapter of FIG. 3A;

DETAILED DESCRIPTION

The present disclosure describes embodiments of a connector for fluidly connecting one component to another with a quick and easy-to-use connection mechanism. The connector is in the form of an adapter which may be placed at the end of a fluid conduit, such as a hose, and which includes the connection mechanism for securing the fluid conduit to another component, such as, but not limited to, a valve which supplies a fluid to the fluid conduit through a joint created by the adapter being joined to the valve. The adapter includes a space which is configured to receive a portion of the valve to create a flow path for the fluid through the adapter and into (or out of) the fluid conduit connected to the adapter. The adapter includes one or more lock buttons which are movable between a retracted (or unlocked) position and an engaged (or locked) position. The one or more lock buttons include arms which are configured to move into the space of the adapter and engage a portion of the valve in the locked position and retract into a body of the adapter in the unlocked position to allow the valve to move freely into and out of the space.

Figure 1:
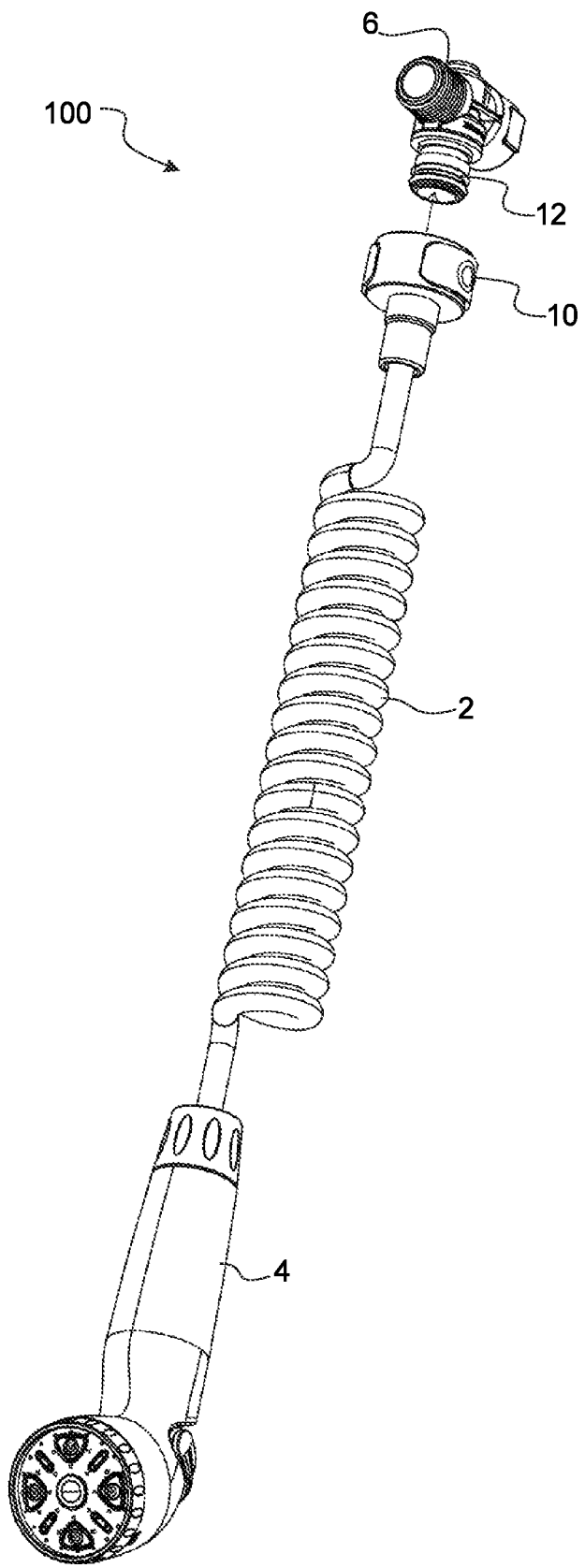
FIG. 1 is a perspective view of an exemplary connector system, consistent with disclosed embodiments.

FIG. 1 is a perspective view of an exemplary connection system 100 for fluidly connecting components, such as a hose 2 and a sprayer 4 to a diverter valve 6. The connection system 100 preferably includes an adapter 10 that, in the illustrated example, is attached to an end of the hose 2. The connection system 100 further includes a diverter outlet 12 as part of the diverter valve 6. The adapter 10 is configured to receive and connect to the diverter outlet 12 to form a joint which allows fluid, such as water, to flow through the diverter valve 6 and into the hose 2 and eventually to the sprayer 4. The diverter valve 6 is configured to connect to a fluid supply, such as a shower spigot or faucet and configured to deliver the fluid to the hose 2 through the adapter 10. The connection between the adapter 10 and the diverter outlet 12 is fluid-tight and removable through a connection mechanism, as will be described in more detail. Further, while the disclosed connection mechanism is described in an exemplary embodiment as connecting the end of the hose 2 to the diverter valve 6, it should be understood that the adapter 10 may be used to connect other components, such as the hose 2 and the sprayer 4, or other fluid conduit components not specifically shown.

Figure 2A:
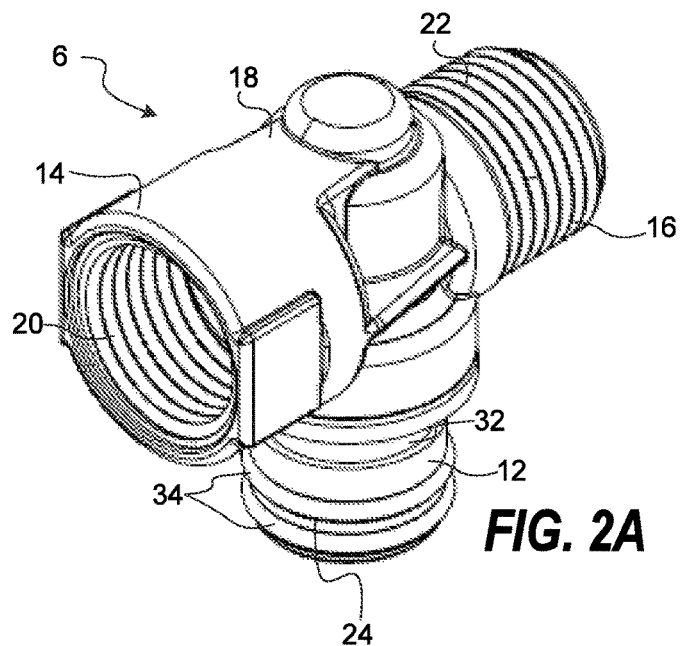
FIG. 2A is a perspective view of an exemplary diverter valve of the connector system of FIG. 1, consistent with disclosed embodiments.

FIG. 2A is a perspective view of an exemplary embodiment of the diverter valve 6. The diverter valve 6 includes the diverter outlet 12, a fluid inlet 14, a fluid outlet 16, and a valve body 18. The fluid inlet 14 is configured to connect to a fluid source, such as a shower spigot. The fluid inlet 14 may include a threaded connector 20 configured to mate with a corresponding threaded connector (not shown) of the fluid source. The fluid outlet 16 is configured to connect to another fluid conduit, such as a shower head. The fluid outlet 16 may include a threaded connector 22 configured to mate with a corresponding threaded connector (not shown) of the shower head or other fluid conduit. The diverter outlet 12 may include a diverter nut 24 which is connected to the valve body 18.

Figure 2B:
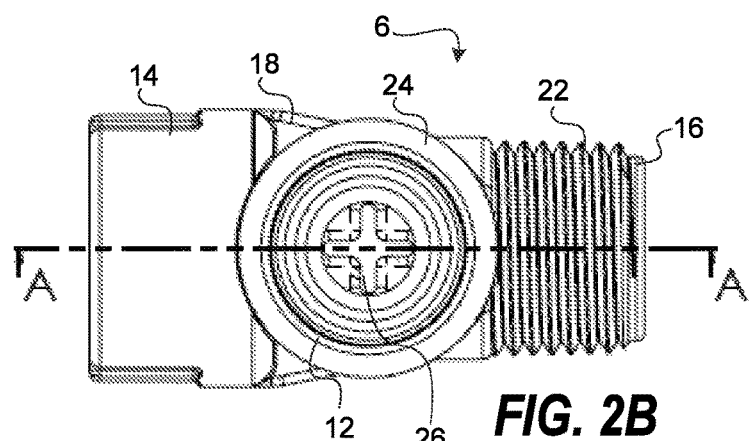
FIG. 2B is a bottom view of the diverter valve of FIG. 2A.

FIG. 2B is a bottom view of the diverter valve 6. The diverter nut 24 includes an opening for delivering fluid out of the diverter outlet 12. The diverter valve 6 further includes a control valve 26 which controls the flow of fluid from the fluid inlet 14 to either of the fluid outlet 16 or the diverter outlet 12. The control valve 26 is preferably located in the valve body 18 and movable to control the direction of flow through the diverter valve 6. For example, in one position of the control valve 26, fluid is free to flow from the fluid inlet 14 to the fluid outlet 16, in the shower example allowing water to flow to the shower head, and in another position of the control valve, the path to fluid outlet 16 is blocked, and fluid directed from the fluid inlet 14 to the diverter outlet 12 and in this case to a hose ending in a hand-held sprayer 4.

Figure 2C:
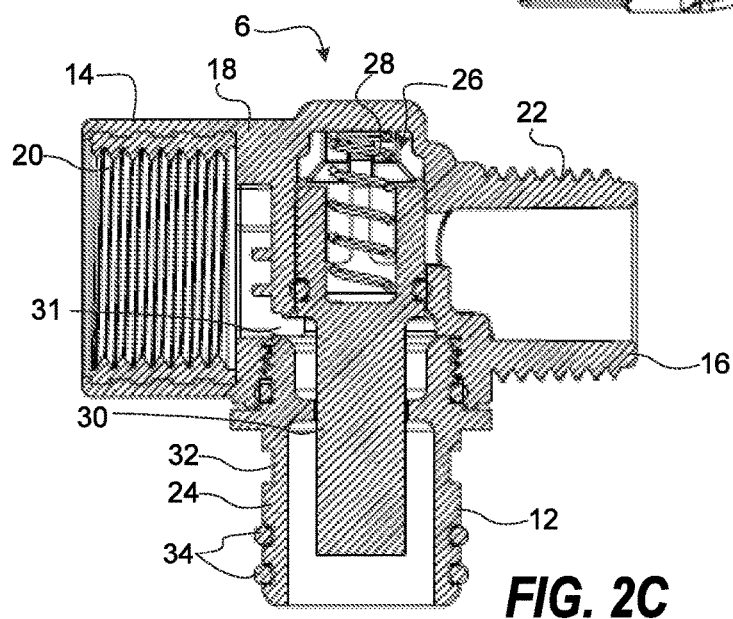
FIG. 2C is a cross-sectional view of the diverter valve of FIG. 2A, taken along line A-A of FIG. 2B.

FIG. 2C is a cross-sectional view of the diverter valve 6, taken along line A-A of FIG. 2B. The control valve 26 includes a spring 28 and a switch shaft 30. The spring 28 biases the switch shaft 30 toward the diverter outlet 12, closing a path 31 from the fluid inlet 14 to the diverter outlet 12. When the switch shaft 30 is in the biased position, a fluid path exists between the fluid inlet 14 and the fluid outlet 16. The switch shaft 30 is configured to be moved away from the diverter outlet 12 (upward, as shown in FIG. 2C), against the force of the spring 28 in order to open the path from the fluid inlet 14 to the diverter outlet 12, and closing the path from the fluid inlet 14 to the fluid outlet 16. In this way, the position of the switch shaft 30 controls the flow of fluid within the diverter valve 6.

The diverter nut 24 is configured to connect to another element (e.g., the adapter 10) in order to deliver fluid that travels from the fluid inlet 14 to the diverter outlet 12. The diverter nut 24 is preferably substantially cylindrical and includes a circumferential groove 32 in an outer surface thereof. The diverter nut 24 further includes one or more resilient o-rings 34 which are configured to create a fluid-tight seal when the diverter nut 24 is connected to the adapter 10. The switch shaft 30 extends into and is movable within the diverter nut 24. The diverter nut 24 may be a separate element or integral with the valve body 18. Moreover, it should be understood that the diverter valve 6 is one example of a component which may be connectable to the adapter 10. In other embodiments of the connection system 100, the diverter valve 6 may be replaced by a simple fluid outlet which includes the configuration of the diverter nut 24 and which may or may not include a control valve.

Figure 3A:
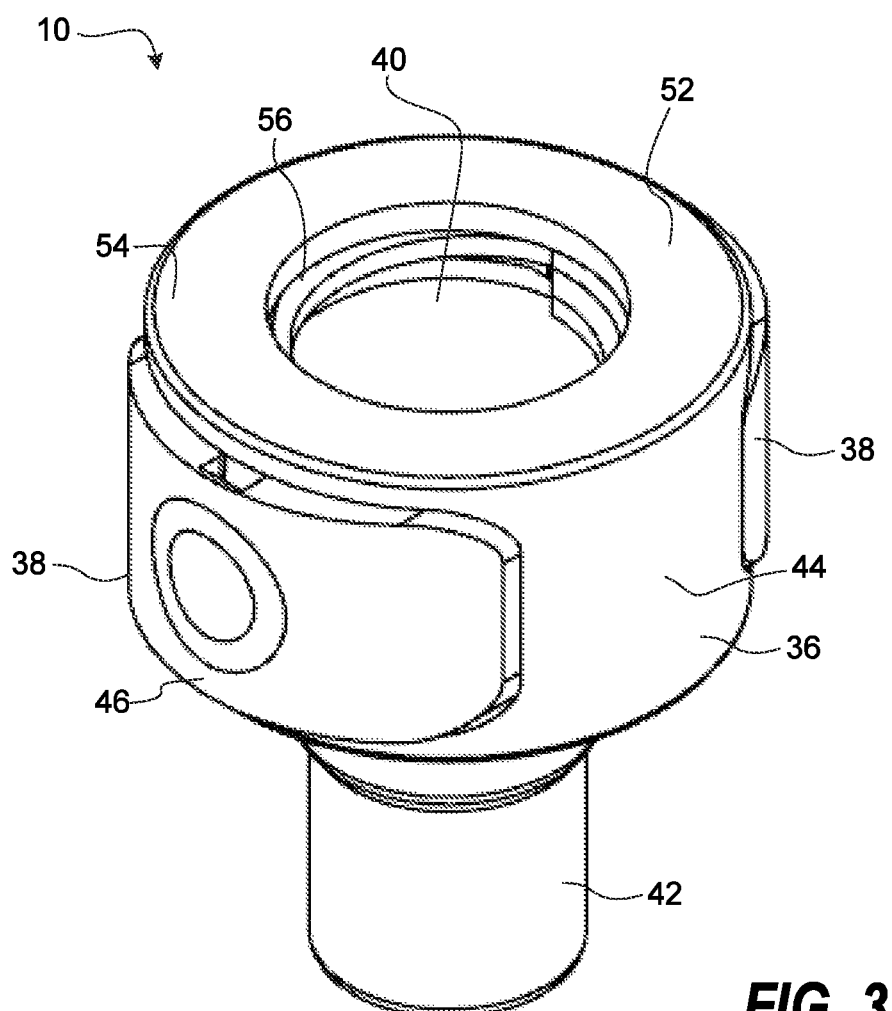
FIG. 3A is a perspective view of an exemplary adapter of the connector system of FIG. 1.

FIG. 3A is a perspective view of an exemplary embodiment of the adapter 10. The adapter 10 includes an adapter body 36 and one or more lock buttons 38. The adapter body 36 is preferably substantially cylindrical and defines a space 40 for receiving another connection element, such as the diverter nut 24. The space 40 is adjacent to an inlet of the adapter 10, thereby allowing another component to enter the space 40. The adapter 10 may further include a hose ferrule cover 42 which connects the adapter to the hose 2, although this is only one example of an element which may be connected at the outlet end of the adapter 10. The space 40 leads to a fluid path through the hose ferrule cover 42 and into the hose 2. In this way, fluid supplied to the adapter 10 is delivered to the hose 2. The one or more lock buttons 38 are movable with respect to the adapter body 36 in order to move between a locked position in which the adapter 10 engages and is securely attached to the diverter nut 24 and an unlocked position in which the adapter 10 is freely movable with respect to the diverter nut 24.

Figure 3B:
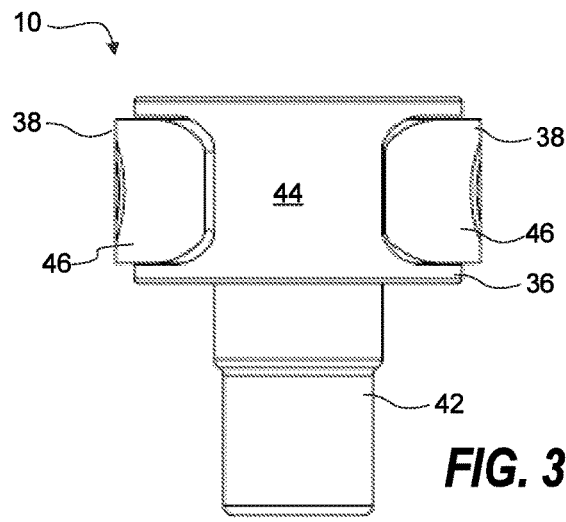
FIG. 3B is a front view of the adapter of FIG. 3A.
Figure 3C:
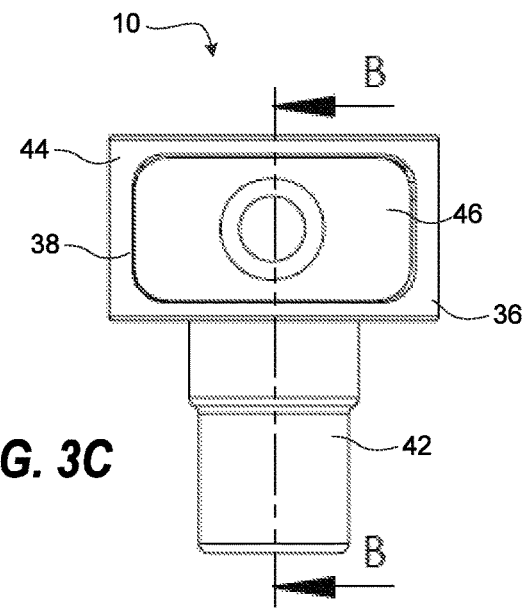
FIG. 3C is a side view of the adapter of FIG. 3A.

FIGS. 3B and 3C illustrate front and side views of the adapter 10. The lock buttons 38 are positioned in a side wall 44 of the adapter body 36 and are configured to move in a radial direction, inward toward a center of the space 40 and outward away from the space 40. The lock buttons 38 include contact elements 46 which are generally curved to match the shape of the side wall 44. The lock buttons 38 are positioned to allow a user to squeeze the contact elements 46 in the inward direction in order to move the adapter 10 from the locked to the unlocked position. While two lock buttons 38 are disclosed, it should be understood that alternative embodiments may include one lock button or three or more lock buttons of the same or similar configuration.

Figure 3D:
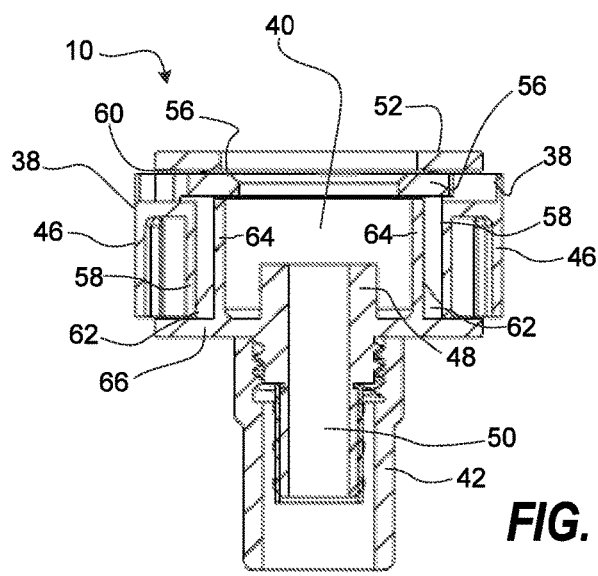
FIG. 3D is a cross-sectional view of the adapter of FIG. 3A, taken along line B-B of FIG. 3C.

FIG. 3D is a cross-sectional view of the adapter 10, taken along line B-B of FIG. 3C. The space 40 is generally cylindrical and configured to receive the diverter nut 24. A projection 48 extends into the space 40 and is configured to engage the switch shaft 30 of the diverter valve 6. The projection 48 includes a channel 50 at an outlet of the adapter 10. The channel 50 connects the space 40 to the hose ferrule cover 42 and, ultimately, to the hose 2. The adapter body 36 includes a collar 52 which forms a top surface 54 and defines an inlet to the space 40. The lock buttons 38 are positioned beneath the collar 52 and are movable into the space 40 through radial movement.

The lock buttons 38 include arms 56 and spring tabs 58 which extend from the contact elements 46. The arms 56 extend through a slot 60 beneath the collar 52, thereby allowing the arms 56 to reach an opposite side of the space 40. The spring tabs 58 are configured to engage the adapter body 36 to maintain the lock buttons 38 in a locked position. For example, the adapter body 36 may include ribs 62 which contact a lower portion of the spring tabs 58 and stop contact elements 46 from moving further inward toward the center of the space 40. The ribs 62 are connected to a support wall 64 which surrounds the space 40 and extends upward from a support flange 66 surrounding the projection 48. The slot 60 is formed between the collar 52 and the support wall 64. When the lock buttons 38 are pressed inward with sufficient force, the spring tabs 58 are configured to bend to allow the contact elements 46 to move further inward and the arms 56 to move further within the slot 60, thereby exposing the full width of the cylindrical space 40 (thereby allowing insertion or removal of the diverter nut 24). When the pressure is released, the spring tabs 58 push off of the ribs 62 in order to return the contact elements 46 (and arms 56) to the original position (where they inhibit insertion or removal of the diverter nut 24). This arrangement is described in greater detail with reference to FIGS. 5A-5D, below.

FIG. 3E is an exploded view of the adapter 10 with the lock buttons 38 and hose ferrule cover 42 removed from the adapter body 36. The adapter body 36 includes semi-cylindrical cutouts 68 defined by the support wall 64 and support flange 66 and configured to receive the contact elements 46. The slot 60 connects the cylindrical cutouts 68 to the space 40. In an exemplary embodiment, the ribs 62 include pairs of triangular surfaces which connect to the support wall 64 and the support flange 66, but are not limited to this configuration. The hose ferrule cover 42 is a cylindrical element which connects to a nozzle 70 of the adapter body 36, such as through an interference fit or threaded connection.

The lock buttons 38 include the arms 56 which extend outwardly from a top portion of the contact elements 46. In an exemplary embodiment, the arms 56 are curved in a direction parallel to the curvature of the cylindrical space 40 and collar 52. The arms 56 are also dimensioned to fit within the slot 60 such that the curved arms 56 are configured to encircle one half of the space 40 beneath the collar 52. In the locked position, the half circles formed by the arms 56 are offset from each other and distal ends of the arms are in the space 40. In the unlocked position, the half circles of the arms 56 together form a complete circle which is covered by the collar 52. Each arm 56 may include an extension 72 positioned an a respective distal end of the arm 56 and extending in a radial direction away from a center of the corresponding contact element 46. Each contact element 46 may also include a notch 74 configured to receive the extension 72 of the opposite lock button 38.

Figure 4A:
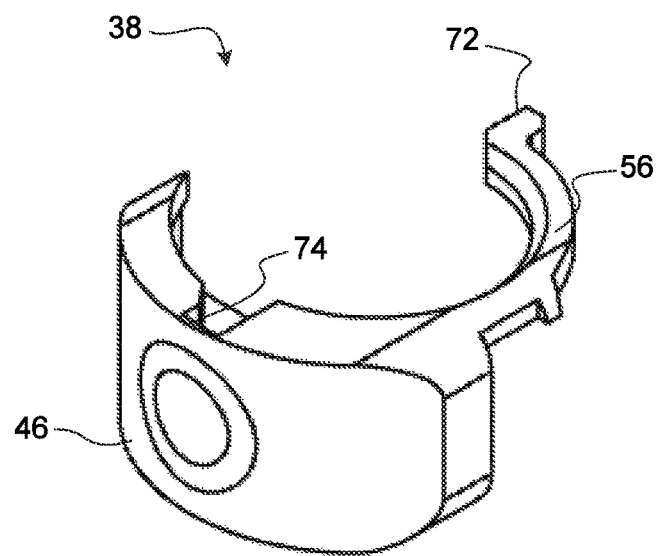
FIG. 4A is a first perspective view of a lock button of the adapter of FIGS. 3A-3E, consistent with disclosed embodiments.
Figure 4B:
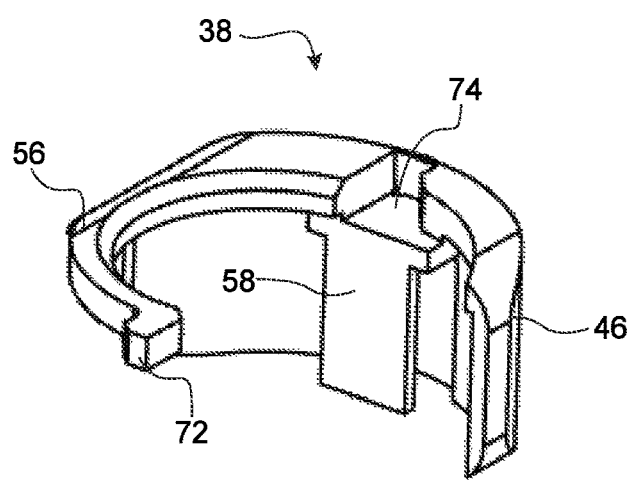
FIG. 4B is a second perspective view of the lock button of FIG. 4A.

FIGS. 4A and 4B further illustrate perspective views of a lock button 38. The arms 56 are preferably formed as extensions of the circular curvature of the contact elements 46, forming a half circle which reaches a point which is opposite a center of the contact element 46. The notch 74 is formed in the contact element 46 at the proximal end of the half circle. The extension 72 is located at the distal end of the half circle. The notch 74 is sized to match the shape of the extension 72 and may include a wide entrance to permit ease of entry of the extension 72 of the opposite lock button 38. The spring tab 58 is formed as a rectangular element which extends downwardly below the notch 74, but is not limited to this configuration. In alternative embodiments, the spring tab 58 may be formed as a coil spring which engages the support wall 64 of the adapter body 36 and biases the contact elements 46 outward.

Figure 5A:
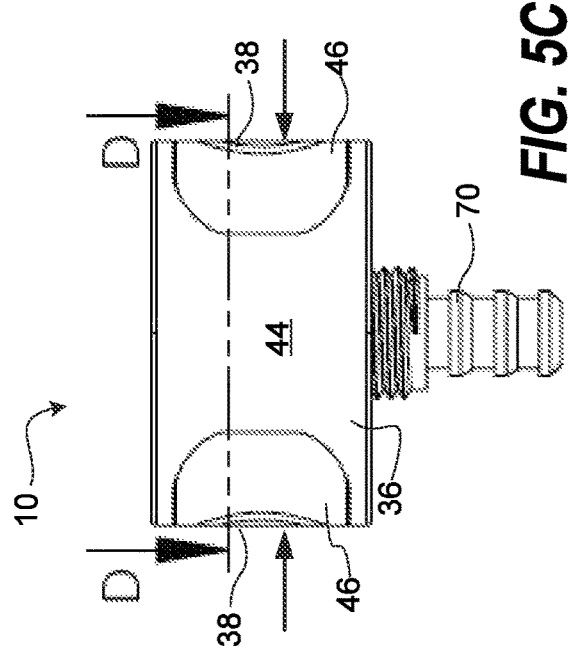
FIG. 5A is a front view of the adapter of FIGS. 3A-3E in a locked position.
Figure 5C:
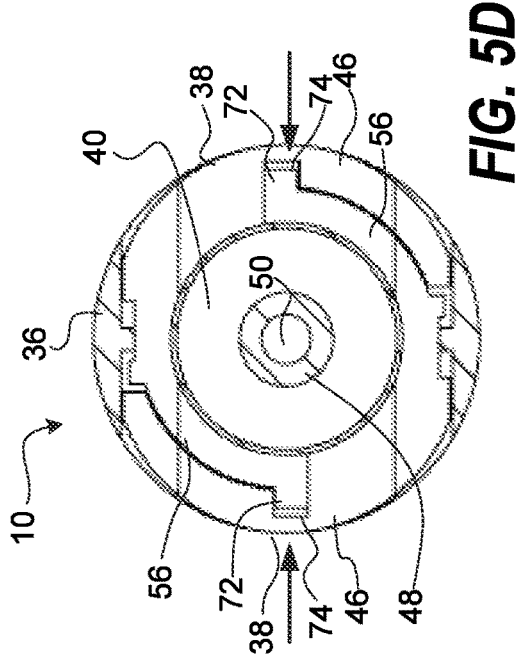
FIG. 5C is a front view of the adapter of FIGS. 3A-3E in an unlocked position.
Figure 5B:
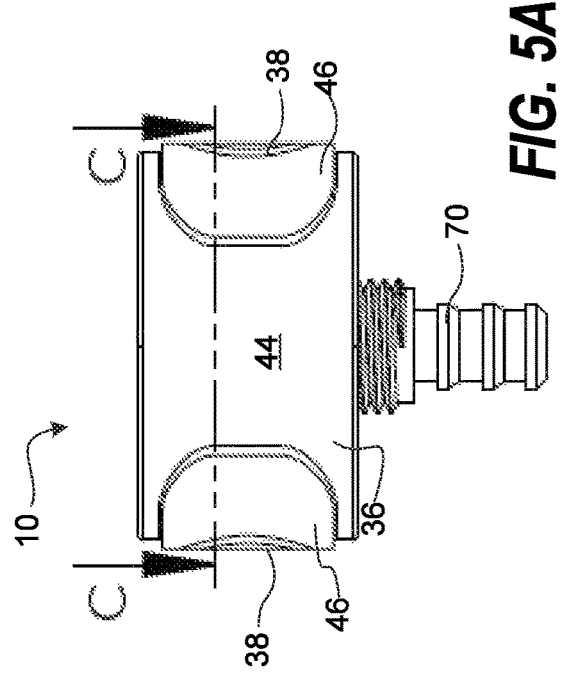
FIG. 5B is a cross-sectional view of the adapter of FIGS. 3A-3E, taken along line C-C of FIG. 5A.

FIGS. 5A and 5B illustrate the adapter 10 with the lock buttons 38 in a locked position. The contact elements 46 protrude slightly from the adapter body 36. FIG. 5B is a cross-sectional view of the adapter 10, taken along line C-C of FIG. 5A, showing the location of the arms 56 within the slot 60 when the adapter 10 is in the locked position (see arrows). In this position, the distal ends of the arms 56 are positioned in the space 40, thereby partially blocking an entrance and exit into the space 40. As shown, the arms 56 of the lock buttons 38 are configured such that each half circle is offset from each other and a distal end portion of each arm 56 is in the cylindrical space 40. In this manner, the arms 56 engage the circumferential groove 32 of the diverter nut 24 (when inserted) to prevent removal of the diverter nut 24.

Figure 5D:
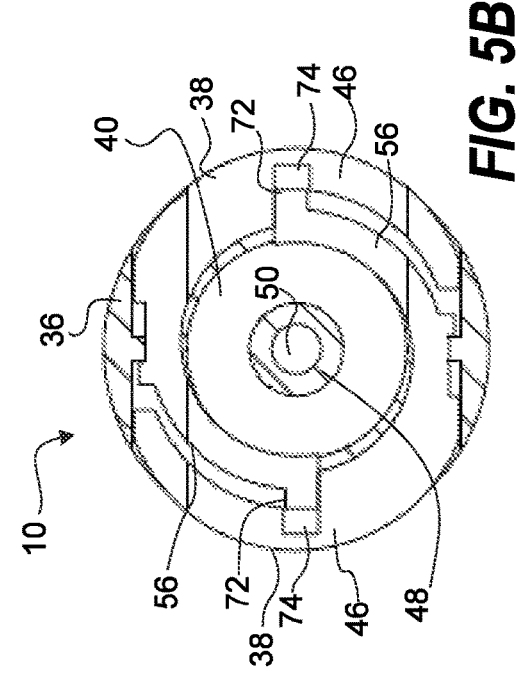
FIG. 5D is a cross-sectional view of the adapter of FIGS. 3A-3E, taken along line D-D of FIG. 5C.

FIGS. 5C and 5D illustrate the adapter 10 with the lock buttons 38 in an unlocked position, such as when they are squeezed by the user. In this position, the contact elements 46 are pressed inward toward a center of the space 40, such as by a user squeezing the contact elements 46 toward each other. FIG. 5D is a cross-sectional view of the adapter 10, taken along line D-D of FIG. 5C, showing the location of the arms 56 outside the slot 60 when the adapter is in the unlocked position. In this position, the movement of the contact elements 46 inward forces the distal ends of the arms 56 outward and out of the space 40 such that the arms 56 are entirely covered by the collar 52. As shown, each half circle of the arms 56 together form a complete circle which is covered by the collar 52. In this way, the space 40 is not obstructed by the arms 56. This allows for insertion or removal of the diverter nut 24, since the arms no longer engage the walls that define circumferential groove 32. With the radial movement of the arms 56, the extensions 72 move into the corresponding notches of the opposite lock button 38. The lock buttons 38 thereby press against each other and further radial movement is stopped. When pressure is released from the contact elements 46, the spring tabs 58 act to force the contact elements 46 outward until the arms 56 are back to the position of FIGS. 5A and 5B (i.e. the locked position).

The disclosed adapter 10 includes a connection mechanism formed by the adapter body 36 and lock buttons 38 which includes movable arms 56 which selectively enter the space 40 defined by the adapter body 36. This creates a locking action which enables the adapter 10 to be quickly and easily attached to another element, such as the diverter valve 6, and, in particular, the diverter nut 24 of the diverter outlet 12. For example, the movable arms 56, which are biased into the locked position in which they are located within the space 40, are shaped to fit within the circumferential groove 32 of the diverter nut 24. Pressing the contact elements 46 thereby moves the arms 56 out of engagement with the circumferential groove 32, allowing the diverter nut 24 to freely move into and out of the space 40. Releasing the pressure on the contact elements 46 when the diverter nut 24 is positioned in the space 40 snaps the arms 56 into engagement with the circumferential groove 32.

Figure 6A:
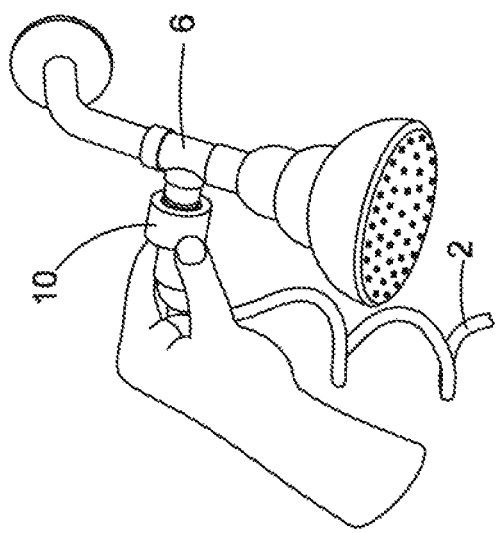
FIG. 6A illustrates an exemplary adapter positioned adjacent to an exemplary diverter valve with a user unlocking the adapter for placement over a portion of the diverter valve.

FIGS. 6A-6D illustrate an exemplary process by which the adapter 10 is connected to the diverter valve 6. In FIG. 6A, the lock buttons 38 are depressed, thereby retracting the arms 56 such that they are covered by the collar 52 and the space 40 is unobstructed. Due to the half-circle configuration, the arms 56 are retracted by moving outward, away from a center of the space 40, in conjunction with the inward movement of the contact elements 46 on the opposite side of the space 40. The size and curvature of the arm 56 generally matches the size and curvature of the collar 52 such that the arms 56 are hidden when the contact elements 46 are pressed toward each other.

Figure 6B:
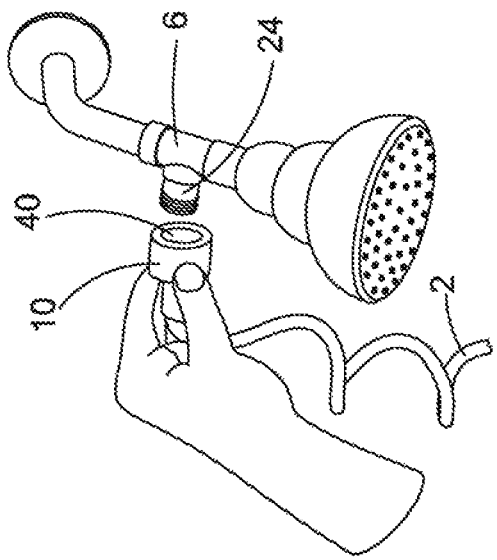
FIG. 6B illustrates the adapter connected to the diverter valve with user allowing the adapter to lock on to the diverter valve by releasing the lock buttons.

In FIG. 6B, with the lock buttons 38 depressed, the adapter 10 is moved over the diverter nut 24 which extends outward from the diverter valve 6. This causes the projection 48 to contact the switch shaft 30 and move the switch shaft 30 in an axial direction against the force of the spring 28, thereby opening the path 31. The lock buttons 38 are released by the user causing the spring tabs 58 to push the contact elements 46 outward and moving the arms 56 inward back into the space 40. The arms 56 engage the circumferential groove 32 of the diverter nut 24, thereby locking the adapter 10 to the diverter valve 6. The o-rings 34 engage the adapter body 36 to seal the connection. In this position, a flow path through the path 31 and channel 50 fluidly connects the fluid inlet 14 to the hose 2. The adapter 10 is thus connected to the diverter valve 6 and fluid is free to flow to the sprayer 4.

Figure 6C:
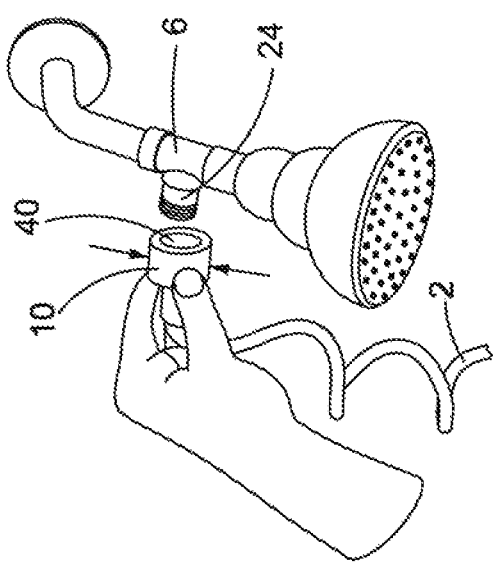
FIG. 6C illustrates the adapter still connected to the diverter valve and the user pressing the lock buttons to unlock the adapter.
Figure 6D:
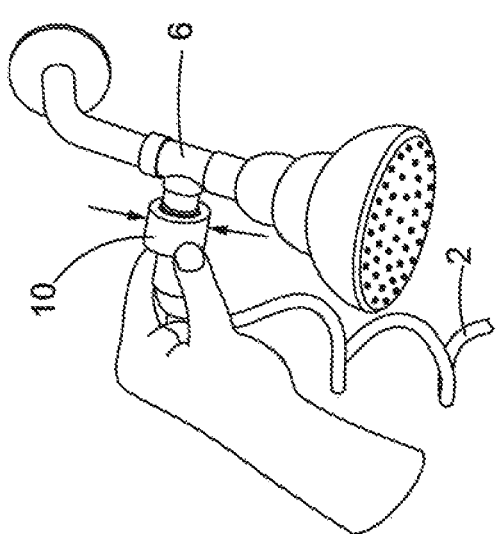
FIG. 6D illustrates the adapter being removed from the diverter valve.

In FIG. 6C, the lock buttons 38 are depressed in order to move the adapter 10 back to the unlocked position for removal. The arms 56 are again retracted beneath the collar 52 and moved out of the circumferential groove 32. This frees the diverter nut 24 to be removed from the space, as shown in FIG. 6D. The switch shaft 30 is released and the spring 28 closes the path 31 such that the fluid outlet 16 is again fluidly connected to the fluid inlet 14.

The disclosed adapter provides an effective connector for attaching one fluid conduit to another quickly and easily. The adapter can be attached with a snap-on action by simply releasing the lock buttons to automatically engage the diverter valve (or other component, such as a spigot or faucet with the configuration of the disclosed diverter nut). The adapter is also easily detached through a similar action of depressing the lock buttons. The adapter forms a tight seal and locked connection. The components of the connection system 100 may be formed from selected materials such as ABS plastic, electroplated ABS plastic, stainless steel, POM plastic, etc.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. The system, components, and processes of the figures are not exclusive. Other systems, components, and processes may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention.

The invention claimed is:

1. An adapter for connecting components in a fluid system, comprising:
   an adapter body having an outer cylindrical side wall, and a cylindrical space surrounded by the outer cylindrical side wall, the adapter body comprising:
      a circular collar defining an inlet into the cylindrical space;
      a projection extending into the cylindrical space, the projection including a channel defining an outlet out of the cylindrical space;
      a support wall and a support flange defining one or more cutouts in the outer cylindrical side wall, wherein the support flange is parallel to the circular collar, the support wall is perpendicular to the circular collar, and the support wall surrounds the projection and extends toward the circular collar from the support flange;
      a slot defined between the circular collar and the support wall connecting the one or more cutouts to the cylindrical space; and
   one or more lock buttons, each comprising:
      a contact element positioned in a corresponding cutout of the one or more cutouts; and
      an arm projecting away from the contact element and positioned in the slot,
   wherein the one or more lock buttons are biased into a locked position in which a distal end portion of the arm of each lock button is partially in the cylindrical space and movable into an unlocked position in which the arm of each lock button is covered by the circular collar such that the arm of each lock button is not in the cylindrical space.

2. The adapter of claim 1, wherein the adapter further comprises a nozzle and a hose ferrule cover for connecting the adapter to a hose.

3. The adapter of claim 1, wherein the contact elements are generally curved to match the shape of the side wall of the adapter body.

4. The adapter of claim 3, wherein the one or more lock buttons comprise two lock buttons and the contact elements of the two lock buttons are opposed from each other to allow a user to squeeze the lock buttons toward each other.

5. The adapter of claim 1, wherein the adapter body further comprises a projection which projects from the support flange into the cylindrical space toward the inlet.

6. The adapter of claim 5, wherein the channel is formed in the projection.

7. The adapter of claim 1, wherein the one or more lock buttons each further comprise a spring tab which biases the one or more lock buttons into the locked position.

8. The adapter of claim 7, wherein the adapter body further comprises one or more ribs connected to the support wall and located in the one or more cutouts, and wherein a lower portion of the spring tab contacts the one or more ribs and the spring tab is configured to bend against the one or more ribs when pressure is applied to allow the contact element to move further inward and the arm to move further within the slot, and wherein the spring tab pushes against the one or more ribs to return the one or more lock buttons to the locked position when the pressure is released.

9. The adapter of claim 1, wherein the arms of the one or more lock buttons are curved in a direction generally parallel to a curvature of the cylindrical space and the circular collar.

10. The adapter of claim 9, wherein the arms of the one or more lock buttons form a half circle which reaches a point opposite a center of the contact element.

11. The adapter of claim 10, wherein the one or more lock buttons comprise two lock buttons, and wherein, in the locked position, the arms of the two lock buttons are configured such that each half circle is offset from each other and a distal end portion of each arm is in the cylindrical space, and, in the unlocked position, each half circle of the arms together form a complete circle which is covered by the circular collar.

12. The adapter of claim 11, wherein each arm of the two lock buttons comprises an extension which extends in a radial direction and each contact element of the two lock buttons comprises a notch configured to receive the extension of the other of the two lock buttons when the two lock buttons are moved into the unlocked position.

13. A connection system for fluidly connecting components, comprising:

a first component comprising a cylindrical body defining a channel and a circumferential groove formed in an outer surface of the cylindrical body, wherein the first component is a diverter valve comprising a fluid inlet, a fluid outlet, and a diverter outlet;

a second component comprising:

a body defining a cylindrical space configured to receive the cylindrical body of the first component, a pair of cutouts formed in an outer side wall of the body, and a slot connecting the pair of cutouts to the cylindrical space; and a pair of lock buttons, each comprising:

a contact element positioned in a corresponding cutout of the one or more cutouts; and an semi-circular arm projecting away from the contact element and positioned in the slot, wherein the lock buttons are biased into a locked position in which distal ends of the arms engage the body of the first component in the circumferential groove and are movable into an unlocked position in which the distal ends of the arms are moved out of the circumferential groove through the contact elements being moved toward each other.

14. The connection system of claim 13, wherein the diverter outlet includes a diverter nut having the cylindrical body with the circumferential groove.

15. The connection system of claim 13, wherein the first component further comprises one or more o-rings configured to create a seal when the first component is positioned in the cylindrical space of the second component.

* * * * *